Nov. 5, 1957 K. W. PRATT 2,812,063
VIBRATORY APPARATUS FOR TREATING MATERIALS
Filed Nov. 17, 1953
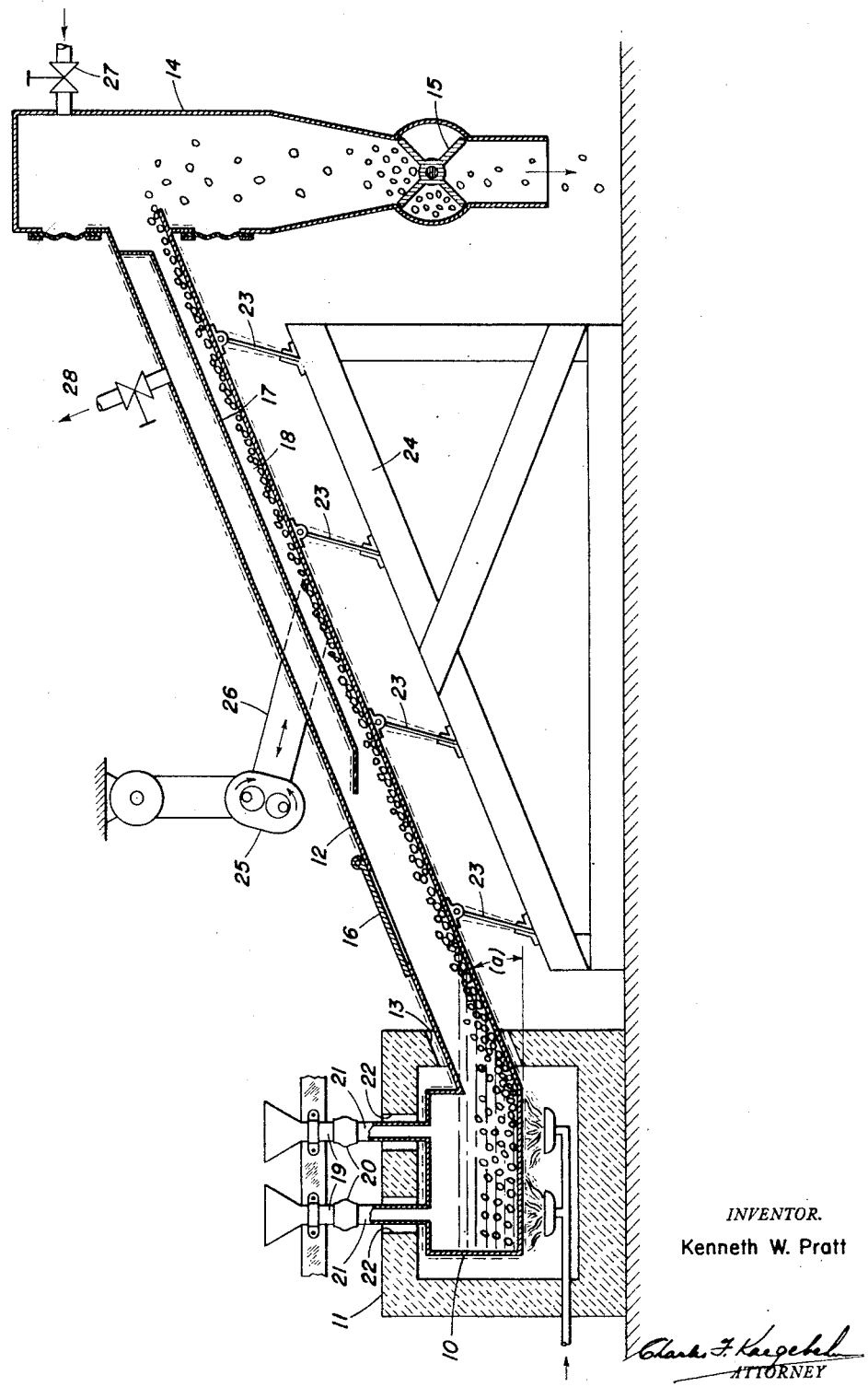
INVENTOR.
Kenneth W. Pratt United States Patent Office 2,812,063
Patented Nov. 5, 1957

2,812,063
VIBRATORY APPARATUS FOR TREATING MATERIALS

Kenneth W. Pratt, Fords, N. J., assignor to National Lead Company, New York, N. Y., a corporation of New Jersey Application November 17, 1953, Serial No. 392,632
2 Claims. (Cl. 210—179)

The present invention relates in general to the treatment of solid and liquid components and more especially to an improved process and apparatus for treating materials in a manner to separate continuously the solid and liquid components thereof.

In many types of material treatment and/or reacting processes, the final products comprise an admixture of solids or quasi solids and liquids from which the solids or quasi solids are recovered by filtration, hydro-separation, evaporation and similar techniques. Among such processes may be included chemical reactions involving the formation of slurries, crystals, amorphous solids, metallic sponge and the like; and physical reactions involving settling, deliquoring, filtration, leaching, classification, etc.

Heretofore in each of these broad classifications the separation of the solid component from the liquid component has been a separate step and one which has succeeded treatment of the solid and liquid components.

An object, therefore, of the present invention is to provide an improved process for treating materials in a manner such that the solid and liquid components are continuously separated during such treatment.

Another object of the invention is to provide an improved process for reacting materials in a manner to form and continuously separate a solid component from a liquid component.

A further object of the invention is to provide an improved process for forming soluble and insoluble components while concurrently separating the soluble components from the insoluble components.

A further object of the invention is to provide an improved process for removing the solid component from a slurry.

A still further object of the invention is to provide superior apparatus for reacting materials chemically and/or physically in a manner to produce solid and liquid components while continuously removing the solid component from the liquid component.

These and other objects, features and advantages of the invention are described more fully in the specification which follows.

In its broadest aspects the instant invention relates to a process and apparatus for treating materials, physically or chemically, in a manner to continuously separate a solid component from a liquid component during such treatment. Typical chemical reactions are those wherein two or more constituents are reacted under suitable conditions of temperature and pressure to form a solid or quasi solid component and a liquid component from which the solid or quasi solid component is precipitated, as for example a crystalline or amorphous material, aggregates, metallic sponge, pellets and the like; while physical reactions may include filtering, classification, leaching, washing, etc.

In carrying out the process of the invention the materials to be treated either chemically or physically, are charged into a chamber having as an integral part thereof an inclined tubular extension, and treated therein under suitable conditions of temperature and pressure, and while the chamber and its tubular extension are being vibrated at a predetermined frequency in a direction longitudinally of the length of the tubular extension whereby the solid and/or quasi solid components are continuously withdrawn from the liquid component in the chamber and transmitted up the inclined tubular extension to be discharged therefrom into a suitable receiver. The treatment may be carried out at atmospheric pressure or at pressures above or below atmospheric pressure, in an inert atmosphere or an atmosphere of a particular gas and at predetermined temperatures depending upon the nature of the materials and treatment being employed. While the frequency and amplitude of vibration of the chamber and its inclined tubular extension are determined, in part, by the nature of the solid or quasi solid components and in part by the angle of inclination of the tubular extension, it has been found, in general, that the separation of solids or quasi solids from a liquid in most chemical and/or physical reactions is satisfactorily accomplished when the frequency of vibration of the reaction chamber and its tubular extension are in the range of from 200 to 1000 cycles/minute and the amplitude of vibration is in the range of from 0.25″ to 1 inch. It will be understood, however, that the specific frequencies and amplitudes of vibration mentioned above are not critical to the success of the invention, but are illustrative of frequency and amplitude ranges which have been found to be applicable to a large number of chemical and/or physical reactions for separating solid and liquid components.

One form of apparatus for carrying out the process of this invention is illustrated schematically in the drawing, and as shown, comprises a reaction chamber 10 enclosed within a heating unit, indicated at 11, and provided with an integral tubular extension 12 which is inclined at a vertical angle (a) relative to a horizontal plane. The lower end of the tubular extension is joined to the reaction chamber 10 adjacent its base, and in this sense is an extension of its base; and extends therefrom upwardly through a suitable aperture 13 in the wall of the heating unit 11. The upper end of the inclined reaction chamber extension 12, sometimes referred to hereinafter as the elevator, is connected by a flexible connection to a materials receiving unit 14 which may be in the form of a hopper or the like provided with a star valve 15 or similar closure means in its bottom end.

As shown in the drawing and described above, the elevator 12 of the reaction chamber 10 is an integral part thereof and is adapted to incorporate the function thereof and hence is closed from the atmosphere, the preferred form of the elevator 12 being that of a trough shaped member which is rectangular in cross section, and provided with an integral top wall having an opening therein closed by a hinged cover 16 or the equivalent to give access to the interior of the elevator. The latter is also shown provided with a baffle member 17 comprising a substantially flat sheet of metal secured to the top wall of the elevator adjacent its upper end and in spaced parallel relationship thereto, and extending downwardly therefrom to a point adjacent its lower end, thereby to provide a passage 18 of vertically restricted height in the upper end of the elevator 12 for controlling the passage of solids and quasi solids, upwardly into the hopper 14.

The constituents to be reacted in the reaction chamber 10 may be fed into the latter in any suitable manner, as exemplified in the drawing by the two feed pipes 19—19, which are secured to a fixed support and connected at their lower ends by flexible sleeves 20—20 to the upper ends of the corresponding feed pipes 21—21 which extend upwardly from the top wall of the reaction chamber through suitable apertures 22—22 in the top wall of the heating unit 11. As pointed out above and described in more detail below, the reaction chamber and its tubular elevator 12 are adapted to be vibrated longitudinally of the elevator, and consequently the aforesaid apertures 13 and 22—22 are of ample dimensions to permit the reaction chamber and its tubular elevator 12 to vibrate freely. From the foregoing description it will be evident that the reaction chamber 10, its elevator 12 and the hopper 14 constitute, in effect, a closed system wherein any desired atmospheric condition may be maintained in the manner and by the means described below.

The reaction chamber and its tubular elevator 12 are supported for vibration in a direction longitudinally of the axis of the reaction chamber extension 12 by means of resilient supporting elements indicated generally at 23. The latter, as represented in the drawing, may comprise leaf springs secured at their upper ends to the bottom side of the elevator 12 and at their lower ends to a fixed support 24. It will be understood, however, that although leaf springs are satisfactory, other types of resilient suporting means may be used. Vibration of the reaction chamber and its elevator 12 is effected by means of any suitable device which will impart vibration of relatively low frequency and amplitude thereto in the direction of the longitudinal axis of the elevator. One such vibrating device may comprise a motor driven eccentric as indicated at 25 having an arm or arms 26 connected to the elevator 12.

In addition to these features of the apparatus, it is within the purview of the invention to provide within the reaction chamber and its elevator 12 an atmosphere of any suitable gas necessary for carrying out the reaction therein and to this end a gas inlet cock 27 may be provided in the hopper 14 or at some other convenient point in the system. Further, a gas exhaust cock may be provided in the closed system, as exemplified at 28 in the elevator 12, either for the purpose of exhausting reaction gases from the closed system or providing a vacuum within the reaction chamber and its elevator depending upon the nature of the reaction.

In carrying out a chemical process by the above described apparatus of this invention, the materials to be reacted are fed into the reaction chamber 10 by way of the feed pipes 19—19, 21—21, where they are heated to the required temperature for bringing about a reaction between the materials to form solid or quasi solid components and a liquid component. Throughout the reaction period and the subsequent selective separation of the solid or quasi solid components from the liquid component, the reaction chamber and its elevator 12 are being constantly vibrated by the vibrating means 25—26 at a frequency and amplitude of vibration determined by the physical characteristics of the solid or quasi solid component. Thus, as the solid or quasi solid component is formed, it is being withdrawn continuously from the reaction chamber 10 and moved up the elevator 12 by reason of the longitudinal vibration of the latter, the solid or quasi solid components gradually moving up the elevator 12 to the upper end thereof from which the solid or quasi solid components are discharged into the hopper 14. During the passage of the solid or quasi solid components upwardly in the elevator 12, any liquid clinging to the solid or quasi solid components is selectively separated therefrom so that the solid components are delivered into the hopper 14 substantially free of liquid.

Among the types of chemical reactions which it is contemplated may be carried out in the above described apparatus by the process of this invention is, for example, that of reacting liquid or vaporous titanium tetrachloride with a reducing metal, such as magnesium, in an alkali metal or alkaline earth metal bath within the reaction chamber to form and precipitate out discrete particles of titanium metal or titanium metal sponge which would be carried up continuously out of the reaction chamber 10 by the vibrating chamber extension 12 and discharged into a receiver 14; or the hydrolysis of a titanium sulfate solution, prepared from a digest of a titaniferous iron material and sulfuric acid, to produce a titanium hydrate slurry which is precipitated from the liquid phase and continuously carried upwardly out of the reaction chamber 10 by means of the vibrating reaction chamber extension 12 into a suitable receiver; or a process for separating a contaminant from a metal, such as, for example, contacting titanium metal with a nitrate containing acid solution whereby the soluble contaminants are solubilized and separated from the solid metal which is carried up out of the acid solution by the vibratory movement of the reaction chamber and its extension 12.

Other illustrations of possible uses of the improved process and apparatus of this invention may include filtration, hydroseparation and washing operations wherein a dispersion of a solid in a liquid is charged into the reaction chamber and the latter together with its elevator 12 vibrated to continuously separate and carry the solid component out of the liquid up the elevator and into a storage bin or the like.

While the above described processes are among those which may be effectively carried out by the process and apparatus of this invention, it will be understood that they are merely illustrative and that other chemical and physical processes may be carried out and are contemplated within the scope of the invention as defined in the appended claims.

From the foregoing description and the drawing, it will be apparent that the invention has many advantages over systems which have previously been used in that the apparatus per se is relatively simple and inexpensive construction embodying a minimum number of mechanical parts subject to wear or maladjustments; and that the apparatus is positive in its action and operable at relatively little expense.

While this invention has been described and illustrated by the examples shown, it is not intended to be strictly limited thereto, and other variations and modifications may be employed within the scope of the following claims.

I claim:

1. Apparatus for reacting materials to produce solid and liquid components and continuously separate the solid component from the liquid component comprising in combination: a heating unit, a reaction chamber constructed and arranged to be housed in said heating unit and having a vertically inclined extension; resilient means arranged to support said reaction vessel in said heating unit with its vertically inclined extension extending therefrom for vibration in the direction of the longitudinal axis of said extension; and vibrating means arranged to vibrate said reaction vessel and its extension at a frequency sufficient to move said solid component up said vertically inclined extension out of said liquid component.

2. Apparatus for reacting materials to produce solid and liquid components and continuously separate the solid component from the liquid component comprising in combination: a heating unit, a reaction chamber movably supported in said heating unit and having a vertically inclined extension extending therefrom; resilient means secured to said inclined extension and arranged to support said reaction vessel and its inclined extension for vibration in the direction of the longitudinal axis of said extension; vibrating means constructed and arranged to vibrate said resiliently supported reaction vessel and its extension at a frequency sufficient to move said solid component up said vertically inclined extension out of said liquid component; a receiving unit; and flexible means arranged to connect said vibrating vertically inclined extension to said receiving unit.

References Cited in the file of this patent

UNITED STATES PATENTS

| | | |
|---|---|---|
| 1,859,450 | Marshall | May 24, 1932 |
| 1,983,968 | Clark | Dec. 11, 1934 |
| 2,326,163 | Patterson | Aug. 10, 1943 |
| 2,329,333 | Carter | Sept. 14, 1943 |
| 2,421,952 | Lipsius | June 10, 1947 |
| 2,462,878 | Logue | Mar. 1, 1949 |